United States Patent Office 3,059,018
Patented Oct. 16, 1962

3,059,018
SYNTHESIS OF ESTERS OF OMEGA-CYANO-ALPHA-OXIMINO CARBOXYLIC ACIDS
Grannis S. Johnson, Levittown, Pa., and Francis E. Gould, Princeton, N.J., assignors to FMC Corporation, a corporation of Delaware
No Drawing.   Filed Sept. 30, 1958, Ser. No. 764,255
4 Claims.   (Cl. 260—465.4)

This invention relates to an improved process for the production of certain alpha-amino carboxylic acids and related compounds. More particularly, this invention provides an improved method for the production of alpha, omega-diamino acids such as lysine, ornithine and arginine, as well as certain compounds related to these acids, and intermediates therefor, many of which were heretofore difficultly available or not at all, and which may be readily produced by the improved process of this invention. This application is a continuation-in-part of copending application Serial No. 718,128, filed February 28, 1958, now abandoned.

In copending application Serial No. 697,786, filed November 21, 1957, now U.S. Patent 2,999,875, is described a novel process for the conversion of cyclic ketones to alpha,omega-diamino acids. In a preferred embodiment of that process, the cyclic ketone is oximinated to form an $\alpha,\alpha'$-dioximino cyclic ketone, which is then cleaved between the carbonyl carbon and one of the alpha-carbons to form an omega-cyano alpha-oximino carboxylic acid, which is then converted to the corresponding alpha-omega-diamino acid. The cleavage is carried out by reacting the $\alpha,\alpha'$-dioximino cyclic ketone with an acylating agent in the presence of aqueous alkali. The cyclic ketone is dissolved in the aqueous alkali, and the acylating agent is added to effect the cleavage. Since there are two oximino groups alpha to the carbonyl group, there is a tendency to dicleavage rather than the desired monocleavage. This dicleavage is minimized by using less than the theoretical amount of acylating agent, but the yield of the desired product is of course reduced as well.

According to the present invention, $\alpha,\alpha'$-dioximino cyclic ketones are converted to esters of omega-cyano alpha-oximino acids by reacting the $\alpha,\alpha'$-dioximino cyclic ketones, at least partially dissolved in a lower aliphatic alcohol containing at least about an equimolar amount of a base, with an acylating agent, which surprisingly enough not only causes monocleavage of the cyclic ketone between the keto group and one of the alpha-oximino groups, but at the same time forms an alkyl ester (of the acid resulting from the monocleavage) corresponding to the alcohol used as solvent. Dicleavage is avoided even with a substantial excess of acylating agent, in marked contrast to cleavage with aqueous alkali, where even a slight excess of cleaving agent produces a substantial amount of dicleavage.

Another surprising facet of this acylation-cleavage reaction is that there is no significant diacylation of the dioximino ketone nor acylation of the omega-cyano alpha-oximino ester, although it is known that these reactions proceed readily. The discovery that cleavage of the dioximino ketone in alcohol is not only readily carried out, but results in substantially quantitative yields of the monocleaved product, was most unexpected.

The preferred acylating and cleaving agents herein are acid anhydrides, which have exhibted a surprising selectivity in reacting with the oximino ketone rather than the alcoholic solvent, since the alcohol is present in large excess, and it is well known that anhydrides normally react very rapidly with alcohols in the presence of acidic or basic catalysts. If an extremely reactive acylating agent is used, however, such as acetyl chloride or benzenesulfonyl chloride, it may actually be necessary to increase the amount of acylating agent to get the desired ratio of reactants, due to alcoholysis of the acyl chloride during the reaction.

As noted above, the product of the cleavage reaction is an ester, rather than a carboxylic acid as is obtained when the cleavage is conducted in aqueous medium. The omega-cyano alpha-oximino esters are much more readily reduced to the diamino compounds that are the acids. In fact, if the carboxylic acid is the cleavage product, best overall yields are generally obtained by first esterifying the acid, then reducing the ester, and then hydrolyzing the ester back to the acid. Since the esterification requires special, time-consuming techniques due to the instability of the alpha-oximino acids and the ease of hydrolysis of the nitrile group, the direct production of the ester is of substantial importance. This advantage, coupled with the improvement in yields, makes the process described herein not only of outstanding theoretical interest but also of great commercial significance.

The overall synthesis of alpha,omega-diamino acids from cyclic ketones is illustrated as follows:

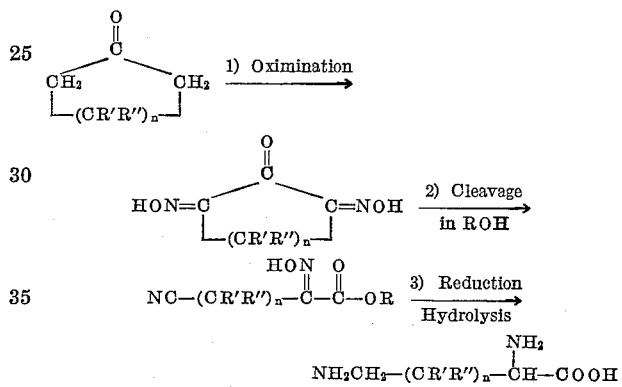

In the above formulae, R is an alkyl group derived from the alcohol present in the cleavage step. In the grouping represented by $(CR'R'')_n$, n is preferably an integer from two to four; that is, the starting material is a five to seven-membered ring; and R' and R'' are each hydrogen or any desired substituent.

For the alpha,omega-diamino acid lysine, important as a nutritional supplement, the starting material is cyclohexanone. If cyclopentanone is the starting material, one possible product is ornithine, which on reaction with cyanamide yields arginine, another important nutritional supplement. If a partial hydrolysis of the nitrile group is carried out before the reduction step, cyclopentanone can be made to yield glutamine, a chemotherapeutic agent which has shown promise against alcoholism and ulcers, or glutamic acid, widely used, in the form of its monosodium salt, as a flavoring agent. If R' and R'' is a substituent other than hydrogen, then substituted lysines, ornithines, arginines, glutamines, glutamic acids, and the like can be synthesized. Such compounds are of considerable interest as chemotherapeutic agents, since they frequently act as amino acid antagonists in living things. Other modifications in the reaction permit the production of a variety of alpha-substituted carboxylic acids and derivatives thereof.

The first step of the process of this invention utilizes a cyclic structure, as illustrated. From practical considerations, these are limited to the 5, 6 and 7-membered ring structures of cyclopentanone, cyclohexanone and cycloheptanone. In these structures the two positions alpha to the keto group should be either unsubstituted or substituted with groups which are readily displaced in the oximination reaction, such as carboxy or carbalkoxy. The rest of the ring may be substituted with any groups that do not interfere with the desired reaction sequence, either by themselves reacting with the introsating agents, or by activating the compounds so that nitrosation occurs at other locations than at the alpha-carbon atoms.

The cyclic ketones may be oximinated by known methods. These are discussed in detail in an article entitled "The Nitrosation of Aliphatic Carbon Atoms" by O. Touster, in Organic Reactions, Vol. VII, John Wiley & Sons, Inc., New York (1948), pp. 327–377. This article describes the various methods of nitrosation, and presents experimental conditions. The most widely used reagent combination is that of an alkyl nitrite and a strong acid, and this combination is effectively and conveniently used in the nitrosation of cyclic ketones to form $\alpha,\alpha'$-dioximino ketones.

Since cyclic ketones react vigorously and exothermically with alkyl nitrites and acid, a low temperature should be maintained during the oximination reaction. The oximination of cyclohexanone, for example, may be carried out over a temperature range of about $-30$ to $+50°$ C. At very low temperatures the reaction proceeds too slowly for convenience, and at temperatures higher than about $50°$ C. the yield may be substantially diminished by tarry side products. A preferred temperature range is about $0-30°$ C., maintained by external cooling. An inert atmosphere, although desirable, is not necessary. Neutralizing the acid after completion of the reaction is also advisable, although not necessary. Other cyclic ketones may be oximinated under similar conditions.

The $\alpha,\alpha'$-dioximino cyclic ketone is then at least partially dissolved in an alcoholic solution of a base. Any alcohol in which the $\alpha,\alpha'$-dioximino cyclic ketone is at least partially soluble may be used. For convenience and economy lower aliphatic alcohols, in which the cyclic ketone is substantially soluble, are preferred, although higher alcohols, such as benzyl and cyclohexyl, may also be used.

As the basic reagent, organic and inorganic bases and basic salts may be used. The base may be a strong base, such as an alkali metal or alkaline earth hydroxide or alkoxide or an organic base such as benzyltrimethylammonium hydroxide, or a weaker base such as an amine, ammonia or pyridine. Basic salts of various strengths such as the metal carbonates, bicarbonates, phenoxides, acetates, cyanides, enolates, and the like may also be used. In addition to those mentioned, there are many other bases and basic salts which are effective, but which are less readily available, more expensive or otherwise less useful. The base used should be at least partially soluble in the alcoholic solvent. Strong bases are generally preferred, since the weaker bases apparently require the use of excess acylating agent for good results.

Alkoxides, which are very efficient cleaving agents, are conveniently used in the parent alcohol, although not necessarily. The metal of the alkoxide may be any metal which displaces hydrogen from an alcohol, but for economy alkali metals such as sodium or potassium are preferred. The alkoxide solution may be prepared by dissolving the metal in the desired alcohol, or by dissolving a preformed metal alkoxide in an alcohol, or by dissolving a metal hydroxide in an alcohol. One mole of base per mole of dioximino ketone, or a slight excess, is adequate. The yield is reduced if less than one mole is used. It is of interest to note that, in aqueous systems, two moles of base are necessary to dissolve one mole of dioximino ketone.

The solution of dioximino cyclic ketone in alcoholic base is then treated with an acylating agent, thereby cleaving the ring structure between the carbonyl carbon and one of the alpha carbons, and forming an alkyl ester of an omega-cyano alpha-oximino acid. The acylating agent may be any one which, when added to a solution of the oxime in alcoholic base, reacts preferentially with the oxime; that is, any acylating agent which will acylate in the presence of alcoholic base.

As indicated above, acid anhydrides are the preferred acylating agents, and about an equimolar amount is generally adequate in strong base. Other acylating agents, such as acyl halides and acyl sulfonyl halides, may also be used, although here some side reaction with the alcoholic solvent generally takes place. Excess acylating agent is not harmful, and may be desirable for good yields under certain conditions, such as the use of an acylating agent which reacts competitively with the solvent, or the use of a weak base.

The cleavage reaction is extremely rapid, and the rate depends on how efficiently the exothermic reaction can be controlled while combining the reactants. The reaction proceeds at temperatures of $-30°$ C. or lower. A convenient temperature range is about $0-50°$ C., although higher temperatures may be used, taking care to avoid alcoholysis of the nitrile group at high temperatures. After the cleavage reaction is completed, the omega-cyano alpha-oximino ester is separated from the reaction mixture. In a convenient procedure, the inorganic salt formed in the reaction is separated by filtration, the solvent is distilled from the ester under reduced pressure, and the ester is extracted from the residue using a suitable solvent. Other methods of working up the product may of course be used.

This cleavage with an acylating agent in alcoholic base may be carried out either on the separated dioximino cyclic ketone or, as a further process improvement, directly on the cyclic ketone/oximination reaction mixture without isolating the dioximino ketone. This may be done whether the oximination is acid catalyzed or base catalyzed. If it is base catalyzed, such as with sodium alkoxide in alcohol, the cyclic ketone dissolved in the basic solution is treated successively with a nitrosating agent and an acylating agent. If it is acid catalyzed, enough base should be added to the mixture after nitrosation to neutralize any excess acid as well as to provide the required equimolar amount of base per mole of cyclic ketone. All this may be carried out in one reactor without separation of any intermediate products between the cyclic ketone and the omega-cyano alpha-oximino carxboxylic ester.

In the synthesis of alpha,omega-diamino acids, the omega-cyano alpha-oximino ester formed in the cleavage step is reduced to the corresponding diamino esters. Catalytic hydrogenation may be used, and a variety of catalyst-solvent systems are effective. Precious metal catalysts which are suitable include unsupported platinum black or palladium black, platinum oxide (Adams' catalyst) and various forms of supported platinum and palladium, for example, on charcoal or alundum. Aliphatic carboxylic acids or anhydrides such as acetic, propionic, and butyric, alone or in admixture with other solvents such as ethers, esters, alcohols and the like are suitable for use with precious metal catalysts. Catalytic hydrogenation of the ethyl ester of 5-cyano-2-oximinovaleric acid to form the ethyl ester of lysine, employing an Adams' catalyst in acetic anhydride, has been described in the literature by Olynyk et al., J. Org. Chem. 13, 465 (1948). Active forms of metals of group VIII of the periodic table, such as "Raney nickel" and "Raney cobalt," are also useful hydrogenation catalysts, generally with solvents such as aliphatic alcohols, although other solvents may be employed. Chemical reduction of the esters may also be used, and the combination of sodium or potassium with an aliphatic alcohol is effective. Electrolytic reduction may also be used. Since in the preferred process both a nitrile and an oximino group are reduced simultaneously, those catalysts and organic or inorganic reducing agents which are used muut be capable of affecting both these groups. The alpha,omega-diamino ester resulting from the reduction may be hydrolyzed to the free acid by standard techniques.

Example 1

Cyclopentanone was nitrosated to form 2,5-dioximinocyclopentanone, as follows: To a solution of 84.1 g. of cyclopentanone in 400 ml. of ether was added 12 ml. of concentrated hydrochloric acid. The solution was cooled to 5° C. and methyl nitrite was passed in from an external generator. The methyl nitrite was generated by adding a solution of 160 ml. of concentrated sulfuric acid in 290 ml. of water slowly to a mixture of 155.2 g. of sodium nitrite, 80.0 g. of methanol, and 100 ml. of water. The reaction mixture was held at 5–15° by external cooling as the methyl nitrite was passed in. A yellow solid precipitated as the reaction proceeded. When all the methyl nitrite has been added, the mixture was allowed to warm to 25°, held for three hours, and treated with 12 ml. of pyridine to neutralize the acid catalyst. The solid product was recovered by filtration, washed with two 50 ml. portions of ether, and dried in vacuo. It amounted to 67.0 g. (47% yield) of 2,5-dioximinocyclopentanone, M.P. 214° C.

*Anal.*—Calcd. for $C_5H_6O_3N_2$: C, 42.25; H, 4.26; N, 19.72. Found: C, 42.41; H, 4.23; N, 19.97.

Example 2

Ethyl 4-cyano-2-oximinobutyrate was prepared by cleavage of 2,5-dioximinocyclopentanone with acetic anhydride and sodium ethylate, as follows: To 750 ml. of absolute ethanol was added portionwise 13.8 g. (0.6 gram atom) of sodium. When all the sodium had dissolved, the solution was cooled to 20° C. and 85.2 g. (0.6 mole) of 2,5-dioximinocyclopentanone was added, the temperature being held at 20–30°. Most but not all of the solid dissolved. Then 61.3 g. (0.6 mole) of acetic anhydride was added dropwise over 20 minutes, the temperature being held at 20–30° C. The solvent was evaporated under reduced pressure at 60–70° C., and the resulting slurry was taken up in 1000 ml. of ether. The solid which failed to dissolve was removed by filtration, and the ether solution was concentrated under reduced pressure to 60.0 g. (59% yield) of liquid ethyl 4-cyano-2-oximinobutyrate. The infrared spectrum of this material was identical to that of a known sample of ethyl 4-cyano-2-oximinobutyrate.

Example 3

Cyclohexanone was oximinated to form 2,6-dioximinocyclohexanone, as follows: To a solution of 171.5 g. of cyclohexanone in 1000 ml. of ether was added 20 ml. of concentrated hydrochloric acid. The solution was cooled to 0° C. and nitrogen was passed slowly through it for 10–15 minutes. Then, with nitrogen flow continuing, methyl nitrite was passed in slowly from an external generator. The methyl nitrite was generated by adding a solution of 139 ml. of concentrated sulfuric acid in 250 ml. of water slowly to a mixture of 290 g. of 95% sodium nitrite, 144 g. of methanol, and 170 ml. of water. The temperature was maintained at —4° to +2° C. by external cooling while the methyl nitrite was passed in. A yellow solid precipitated as the reaction proceeded. The reaction mixture was allowed to warm to 25° and to stand for 3 hours. The solid product was recovered by suction filtration, washed with three 100 ml. portions of ether, and dried in a vacuum desiccator. There was obtained 170.4 g. (56% yield) of crude 2,6-dioximinocyclohexanone, pure enough for use in the next step of the reaction. For an analytical sample, a portion of the material was recrystallized four times from 2:1 methanol-water, the first solution containing a little pyridine. The final product was a mass of fine yellow needles which did not melt but charred in the range of 160–200° C. when heated in a capillary.

*Anal.*—Calcd. for $C_6H_6O_3N_2$: C, 46.15; H, 5.16; N, 17.95. Found: C, 46.22; H, 5.17; N, 17.77.

Example 4

Ethyl 5-cyano-2-oximinovalerate was prepared by cleavage of 2,6-dioximinocyclohexanone, as follows, using acetic anhydride as the acylating agent: A solution of sodium ethoxide in ethanol was prepared by dissolving 11.5 g. (0.50 gram atom) of sodium in 750 ml. of absolute ethanol. To this solution, 78.0 g. (0.50 mole) of 2,6-dioximinocyclohexanone were added at 20–30° C. This mixture was stirred until most of the dioxime was dissolved. Then, 51.0 g. (0.50 mole) of acetic anhydride were added to this solution dropwise with stirring and cooling to 20–30° C. When the addition was complete, the volatile materials were evaporated under reduced pressure. The residue was taken up in 1000 ml. of ether, and the insoluble sodium acetate was filtered off. The filtrate was evaporated to dryness. The crude residue amounted to 73.0 g. (80% yield). A portion was recrystallized from carbon tetrachloride to obtain pure ethyl 5-cyano-2-oximinovalerate, M.P. 73° C. No melting point depression was noted when this material was mixed with authentic ethyl 5-cyano-2-oximinovalerate. Further, the infrared spectra of this product and of authentic ethyl 5-cyano-2-oximinovalerate were identical.

Example 5

Ethyl 5-cyano-2-oximinovalerate was prepared by cleavage of 2,6-dioximinocyclohexanone using pyridine and acetic anhydride in ethanol, as follows: With stirring, 31.2 g. (0.2 mole) of 2,6-dioximinocyclohexanone was added to a mixture of 15.8 g. (0.2 mole) of pyridine and 100 ml. of absolute ethanol. The temperature remained at 25° C. during the addition. To the resulting suspension, 20.4 g. (0.2 mole) of acetic anhydride was added dropwise with vigorous stirring. The temperature rose to a maximum of 35°, then dropped slowly. After an hour, the solvent was removed by evaporation under reduced pressure. The residue was taken up in 500 ml. of ether, and the undissolved solid was removed by filtration. The ether solution was washed with 50 ml. of 1 N hydrochloric acid and with three 50 ml. portions of saturated aqueous sodium bicarbonate. The ether solution was dried over anhydrous magnesium sulfate, and the solvent was evaporated under reduced pressure. There was obtained 10.0 g. (28% yield) of ethyl 5-cyano-2-oximinovalerate, M.P. 70–71° C. Unreacted starting material was not recovered. The infrared spectrum of this material was identical to that of an authentic specimen of ethyl 5-cyano-2-oximinovalerate.

Example 6

Ethyl 5-cyano-2-oximinovalerate was prepared by cleavage of 2,6-dioximinocyclohexanone using n-butylamine and acetic anhydride in ethanol, as follows: To 150 ml. of absolute ethanol, 31.2 g. (0.20 mole) of 2,6-dioximinocyclohexanone were added. To this mixture 14.6 (0.20 mole) of n-butylamine were added. With stirring, 20.4 g. (0.20 mole) of acetic anhydride were added to this mixture at 20–30° C. After the addition was complete, the volatile materials were stripped off. The residue was taken up in 500 ml. of ether and filtered. The filtrate was washed with dilute hydrochloric acid and saturated sodium bicarbonate. Then, this ether solution was decolorized with activated charcoal, and filtered through anhydrous magnesium sulfate. The filtrate was stripped to dryness. A residue of 7.0 g. of brown solid was obtained. This was recrystallized from carbon tetrachloride to obtain 5.0 g. (14% of theory) of product. The infrared spectrum of this material was identical to that of ethyl 5-cyano-2-oximinovalerate. Unreacted starting material was not recovered.

Example 7

Ethyl 5-cyano-2-oximinovalerate was prepared from 2,6-dioximinocyclohexanone as follows, using propionic anhydride as the acylating agent: A solution of sodium ethoxide was prepared by dissolving 5.0 g. (0.22 gram atom) of sodium in 250 ml. of absolute ethanol, and 31.2 g. (0.20 mole) of 2,6-dioximinocyclohexanone were added to this solution. It was stirred until most of the dioxime was dissolved. Then 29.0 g. (0.20 mole) of propionic anhydride were added dropwise with stirring and cooling at 20–30° C. After addition was complete, the mixture was evaporated under reduced pressure. The residue was taken up in ether. The insoluble sodium acetate was filtered off. The filtrate was distilled to remove the ether. The crude residue weighed 37.0 g. (100% yield). This crude material was recrystallized from carbon tetrachloride to obtain pure ethyl 5-cyano-2-oximinovalerate, M.P. 73° C. A mixed melting point of this product with authentic ethyl 5-cyano-2-oximinovalerate showed no depression. Also, the infrared spectra of the two materials were identical.

Example 8

Ethyl 5-cyano-2-oximinovalerate was prepared by cleavage of 2,6-dioximinocyclohexanone as follows, using benzoyl chloride as the acylating agent: A solution of sodium ethoxide in ethanol was prepared by dissolving 5.0 g. (0.22 mole) of sodium in 500 ml. of absolute ethanol. To this solution was added 31.2 g. (0.20 mole) of 2,6-dioximinocyclohexanone. This mixture was stirred until most of the dioxime had dissolved. Then 36.0 g. (0.22 mole) of benzoyl chloride were added at 25–40° C. After addition was complete, the insoluble material (sodium chloride) was filtered off, and excess alcohol was evaporated from the filtrate under reduced pressure. The residue was washed with hexane, and the hexane solution was decanted. The hexane solution was washed with sodium bicarbonate solution and dried, and on evaporation of the hexane there was obtained about 10 grams of ethyl benzoate from reaction of the benzoyl chloride with ethanol. The residue from the hexane washing was washed with ether and filtered, to leave 16 g. of unreacted 2,6-dioximinocyclohexanone. The ether solution was washed with sodium bicarbonate solution to remove benzoic acid. The ether solution was then dried over magnesium sulfate, and evaporated to dryness, to produce 13 g. of ethyl 5-cyano-2-oximinovalerate, identified by comparison of its infrared spectrum with that of authentic material. The yield was 35% overall, 70% based on unrecovered 2,6-dioximinocyclohexanone.

Example 9

2,6-dioximinocyclohexanone was cleaved to form ethyl 5-cyano-2-oximinovalerate, using benzenesulfonyl chloride and sodium ethoxide in ethanol, as follows: A solution of sodium ethoxide in ethanol was prepared by dissolving 5.0 g. of sodium in 400 ml. of absolute ethanol. To this solution was added 31.2 g. of 2,6-dioximinocyclohexanone, followed by 35.4 g. of benzenesulfonyl chloride, dropwise at 20–35° C. After stirring for one hour, the mixture was filtered, to remove 36.0 g. of sodium benzenesulfonate. The filtrate was evaporated to dryness, and the residue was washed with ether, leaving 16.0 g. of tarry material, primarily 2,6-dioximinocyclohexanone. The ether solution was washed with sodium bicarbonate solution, decolorized with charcoal, dried, and evaporated to dryness. From this residue was obtained by distillation 7.5 g. of ethyl benzenesulfonate, B.P. 95–110° C. (1.0 mm. Hg), and a residue of 8.5 g. of ethyl 5-cyano-2-oximinovalerate (23% yield, 46% based on unrecovered starting material).

Example 10

2,6-dioximinocyclohexanone was cleaved with acetyl chloride and sodium ethoxide in ethanol, as follows: A solution of sodium ethoxide in ethanol, was prepared by dissolving 5.0 g. of sodium in 250 ml. of absolute ethanol. To this solution was added 31.2 g. of 2,6-dioximinocyclohexanone, followed by the dropwise addition of 17.0 g. of acetyl chloride at 20–30° C. After the addition was complete the reaction mixture was filtered, to separate 12.0 g. of sodium chloride. The filtrate was then evaporated to remove ethanol, and the residue was taken up in ether, leaving 16.0 g. of ether insoluble material, primarily 2,6-dioximinocyclohexanone. The ether solution was washed with saturated sodium bicarbonate solution, dried over magnesium sulfate, and evaporated under reduced pressure to obtain 14.0 g. of product, which was shown by infrared to be a mixture of ethyl 5-cyano-2-oximinovalerate and ethyl 5-cyano-2-acetoximinovalerate. The combined yield was 39%, or 67% based on unrecovered 2,6-dioximinocyclohexanone.

Example 11

Methyl 5-cyano-2-oximinovalerate was prepared from 2,6-dioximinocyclohexanone as follows: A solution of sodium methoxide in methanol was prepared by dissolving 5.0 g. (0.22 gram atom) of sodium in 250 ml. of absolute methanol. Then, 31.2 g. (0.20 mole) of 2,6-dioximinocyclohexanone were added to this solution. The mixture was stirred until most of the dioxime had dissolved. Then, 22.0 g. (0.22 mole) of acetic anhydride were added dropwise to the mixture at 20–30° C. After the addition was complete, the volatile materials were distilled off at reduced pressure. The residue was taken up in 500 ml. of ether, and the sodium acetate filtered off. The filtrate was decolorized with activated charcoal and dried over magnesium sulfate. The ether was then distilled off, leaving 25.0 g. (74% yield) of methyl 5-cyano-2-oximinovalerate, an oil having $n_D^{25}$ 1.4779, which crystallized to a solid melting at 61.5–62° C. The infrared spectrum of this methyl ester was similar to that of the known compound ethyl 5-cyano-2-oximinovalerate.

Anal.—Calcd. for $C_7H_{10}O_3N_2$: C, 4939; H, 5.92; N, 16.46. Found: C, 49.08; H, 5.95; N, 16.50.

Example 12

Isopropyl 5-cyano-2-oximinovalerate was prepared by cleavage of 2,6-dioximinocyclohexanone with aluminum isopropoxide and acetic anhydride in isopropanol, as follows: To a solution of 6.8 g. (0.033 mole) of aluminum isopropoxide in 250 ml. of isopropanol was added 15.6 g. (0.10 mole) of 2,6-dioximinocyclohexanone. This mixture was stirred so as to dissolve as much of the dioxime as possible. Then 10.9 g. (0.11 mole) of acetic anhydride were added dropwise. The mixture was then evaporated under reduced pressure to a semisolid mass. This mass was taken up in 500 ml. of ether and filtered. The filtrate was washed with saturated sodium bicarbonate solution and then dried over magnesium sulfate and filtered. This filtrate was evaporated to dryness. There was obtained 7.0 g. of a brown oil which was identified as isopropyl 5-cyano-2-oximinovalerate by its infrared spectrum. The yield was 35% of theory.

Example 13

Benzyl 5-cyano-2-oximinovalerate was prepared by cleavage of 2,6-dioximinocyclohexanone with acetic anhydride and sodium benzylate in benzyl alcohol, as follows: A solution of sodium benzylate in benzyl alcohol was prepared by dissolving 2.3 g. of sodium in 200 ml. of benzyl alcohol. Then 15.6 g. of 2,6-dioximinocyclohexanone were added and stirred so that most of the dioxime was dissolved. Then 10.9 g. of acetic anhydride were added at 20–30° C. After the addition was complete, the volatile materials were evaporated. The residue was taken up in 1000 ml. of ether and filtered. Crystals began to appear in the filtrate. The filter cake was washed with water. That which did not dissolve was dried. The ether filtrate was evaporated to dryness and combined with the water-insoluble material to make a total of 14 g. (54% yield) of crude product, M.P. 125–130° C. A portion of this was recrystallized three times from benzene to obtain pure benzyl 5-cyano-2-oximinovalerate, M.P. 132–134°. The infrared spectra of the crude and pure materials were identical.

Anal.—Calcd. for $C_{13}H_{14}N_2O_3$: C, 63.38; H, 5.73; N, 11.38. Found: C, 63.20; H, 5.52; N, 10.97.

*Example 14*

Ethyl 5-cyano-2-oximinovalerate was prepared, using potassium hydroxide as the base, and acetic anhydride as the acylating agent, in ethanol. To a solution of 5.6 g. of potassium hydroxide in 300 ml. of ethanol was added 15.6 g. of 2,6-dioximinocyclohexanone. The mixture was stirred, and 10.2 g. of acetic anhydride was added, the temperature maintained at 20–30° C. by external cooling. When addition was complete, the cooling bath was removed, and the reaction temperature rose to 40°. After the mixture had cooled to room temperature the solvent was evaporated under reduced pressure on the steam bath, and the resulting oil was taken up in 500 ml. of ether. The solution was filtered, and the filtrate was washed with 300 ml. of saturated sodium bicarbonate solution and dried over anhydrous magnesium sulfate. The ether was removed in vacuo to produce 12.0 g. (65% yield) of ethyl 5-cyano-2-oximinovalerate, identified by its infrared spectrum.

Repeating the above experiment, using sodium hydroxide as the base, produced 10.0 g. (54% yield) of ethyl 5-cyano-2-oximinovalerate. No attempt to recover unreacted starting material was made in either case.

*Example 15*

Methyl 5-cyano-2-oximinovalerate was prepared by cleavage of 2,6-dioximinocyclohexanone with benzyltrimethylammonium hydroxide in methanol, and acetic anhydride, as follows: To a solution of 8.3 g. of benzyltrimethylammonium hydroxide in 300 ml. of methanol was added 7.8 g. of 2,6-dioximinocyclohexanone. Most, but not all, of the solid dissolved on stirring. The temperature of the mixture was maintained at 20–30° by external cooling while 5.1 g. of acetic anhydride was added with stirring. When addition was complete, the cooling bath was removed, and the reaction temperature rose to 40°. After the mixture had cooled to room temperature the solvent was evaporated under reduced pressure on the steam bath, and the resulting oil was taken up in 500 ml. of ether. The solution was filtered, and the filtrate was washed with 300 ml. of saturated sodium bicarbonate solution and dried over anhydrous magnesium sulfate. The ether was removed in vacuo to give 5.0 g. (59% yield) methyl 5-cyano-2-oximinovalerate. The infrared spectrum of this product was identical with the spectrum of an authentic sample of methyl 5-cyano-2-oximinovalerate.

*Example 16*

Methyl 5-cyano-2-oximinovalerate was prepared by cleavage of 2,6-dioximinocyclohexanone with magnesium methoxide in methanol, and acetic anhydride, as follows: To a solution of 1.2 g. of magnesium metal in 300 ml. of methanol was added 15.6 g. of 2,6-dioximinocyclohexanone. While stirring and maintaining the temperature at 20–30° C. by external cooling, 5.1 g. of acetic anhydride was added. When addition was complete, the cooling bath was removed, and the reaction temperature rose to 40°. After the mixture had cooled to room temperature the solvent was evaporated under reduced pressure on the steam bath, and the resulting oil was taken up in 500 ml. of ether. The solution was filtered, and the filtrate was washed with 300 ml. of saturated sodium bicarbonate solution and dried over anhydrous magnesium sulfate. The ether was removed in vacuo to yield 11.0 g. (65% of theoretical) of methyl 5-cyano-2-oximinovalerate, identified by its infrared spectrum.

*Example 17*

2,6-dioximino-4-methylcyclohexanone was prepared by nitrosation of 4-methylcyclohexanone, as follows: A solution of 112.2 g. of 4-methylcyclohexanone in 400 ml. of ether containing 12 ml. of concentrated hydrochloric acid was treated with methyl nitrite as described in Example 1. The yellow solid obtained was washed with 150 ml. of water and 50 ml. of acetone, then dried in vacuo. It amounted to 122.0 g. (72% yield) of 2,6-dioximino-4-methylcyclohexanone.

Anal.—Calcd. for $C_7H_{10}O_3N_2$: C, 49.40; H, 5.92; N, 16.4. Found: C, 49.72; H, 5.64; N, 16.22.

*Example 18*

Ethyl 5-cyano-4-methyl-2-oximinovalerate was prepared from 2,6-dioximino-4-methylcyclohexanone, as follows: To 450 ml. of absolute ethanol was added 2.3 g. (0.1 gram atom) of sodium. When all had dissolved, 17.0 g. (0.089 mole) of 2,6-dioximino-4-methylcyclohexanone was added, the temperature being held at 20–30° C. Most but not all of this dissolved. Then 10.2 g. (0.1 mole) of acetic anhydride was added dropwise, the temperature being held at 20–30° C. When all was in, the solids were removed by filtration, and the filtrate was concentrated under reduced pressure at 60–65° C. to a slurry. The slurry was taken up in ether, and the solids which failed to dissolve were removed by filtration. The filtrate was washed with 250 ml. of saturated sodium bicarbonate solution, and dried over anhydrous magnesium sulfate. After drying, the magnesium sulfate was removed, and the filtrate was concentrated under reduced pressure to give 11.0 g. (62% yield) of slightly impure ethyl 5-cyano-4-methyl-2-oximinovalerate, M.P. 51–53°. The infrared spectrum of this material was identical with that of a pure sample of ethyl 5-cyano-4-methyl-2-oximinovalerate.

*Example 19*

A base catalyzed oximination of cyclohexanone in alcohol, followed by cleavage of the intermediate 2,6-dioximinocyclohexanone with acetic anhydride and sodium ethylate in ethanol, was conducted as a single operation, as follows: Five grams (0.22 gram atom) of sodium was dissolved in 300 ml. of absolute ethanol in a reaction vessel, and to this was added 19.6 g. (0.20 mole) of cyclohexanone. A separate ethyl nitrite generator was charged with 36.0 g. (0.52 mole) of sodium nitrite, 24 g. (0.52 mole) of ethanol and 40 ml. of water, and connected to the reactor by a tube leading below the liquid level in the reactor. Then, maintaining the temperature at 30–40° C. in the reactor, a solution of 40 g. (0.40 mole) of sulfuric acid in 40 ml. of water was added dropwise to the generator at room temperature, thereby generating gaseous ethyl nitrite into the reactor. When all the ethyl nitrite had been generated, the reactor contents were stirred for an additional half hour. Then, at 20–30° C., 24 g. (0.24 mole) of acetic anhydride were added to the reactor contents. After this addition was complete, the reactor contents were stripped of volatile materials, the residue taken up in 500 ml. of ether, and the insoluble material filtered off. The filtrate was washed with saturated sodium bicarbonate solution and decolorized with activated charcoal, and then dried over magnesium sulfate. The resulting mixture was filtered, and the filtrate was stripped of ether to obtain 18 g. of product, 50% of the theoretical yield. Recrystallization from carbon tetrachloride produced pure ethyl 5-cyano-2-oximinovalerate, M.P. 73–74° C.

*Example 20*

An acid catalyzed oximination of cyclohexanone in alcohol, followed by cleavage of the intermediate dioxime with acetic anhydride and sodium ethylate in ethanol, was conducted as a single operation, as follows: A generator flask was charged with 36 g. (0.52 mole) of sodium nitrite, 24 g. (0.52 mole) of ethanol and 40 ml. of water. A reactor flask was charged with 19.6 g. (0.20 mole) of cyclohexanone, 150 ml. of absolute ethanol and 4 ml. of concentrated hydrochloric acid. The generator was connected to the reactor with a tube leading below the liquid level in the reactor. With the reactor flask temperature at 30–40° C., 40 g. (0.40 mole) of sulfuric acid in 40 ml. of water was added slowly to the generator at room temperature, thereby generating gaseous ethyl nitrite into the reactor. A solution of sodium ethoxide, which had been prepared by dissolving 6.0 g. (0.26 gram atom) of sodium in 150 ml. of absolute ethanol, was then added to the reactor. While the resulting solution was stirred at 20–30° C., 22 g. (0.22 mole) of acetic anhydride was added. When the addition was complete, the volatile materials were stripped off. The residue was taken up in 300 ml. of ether and filtered to remove solid. The filtrate was washed with sodium bicarbonate solution, decolorized with activated charcoal, dried over magnesium sulfate and filtered. The filtrate was stripped of ether, to obtain 23 g. (64% of theory) of product, which was recrystallized from carbon tetrachloride to yield pure ethyl 5-cyano-2-oximinovalerate, melting at 73–74° C.

*Example 21*

Ethyl 5-cyano-2-oximinovalerate was reduced to form DL-lysine, as follows: In a solution of 36.8 g. of ethyl 5-cyano-2-oximinovalerate in 197 ml. of acetic anhydride was suspended 3.0 g. of platinum oxide, and the mixture was shaken with hydrogen at 50 p.s.i. and room temperature. In about 8 hours the theoretical amount of hydrogen was taken up. The catalyst was filtered from the reaction mixture and washed with 25 ml. of acetic anhydride. The anhydride solution was heated with 300 ml. of water to 50° C., and the solution was stirred until it became homogeneous. Then 450 ml. of concentrated hydrochloric acid was added, and the resulting mixture was heated under reflux for 16 hours. The water and hydrochloric acid were evaporated at reduced pressure at 50–60° C. The resulting syrup was treated twice with 100 ml. portions of concentrated hydrochloric acid, evaporating to a syrup after each treatment. The final syrup was dissolved in 200 ml. of boiling 95% ethanol. The solution was cooled to room temperature, and 800 ml. of ether was added. A white precipitate of DL-lysine dihydrochloride formed. This solid was dissolved in 850 ml. of hot absolute ethanol, and 48 ml. of pyridine in 100 ml. of hot ethanol was added. A white solid precipitated, and after standing for 16 hours at 5° C. the solid was recovered by filtration and dried. It amounted to 21.0 g. (57% yield) of DL-lysine monohydrochloride, M.P. 256–260°. Its infrared spectrum was identical to that of an authentic sample of DL-lysine monohydrochloride.

DL-ornithine was similarly prepared, by reduction and hydrolysis of ethyl 4-cyano-2-oximinobutyrate.

From the foregoing description and illustrative examples it is apparent that the novel process of this invention is susceptible to numerous modifications and variations within the scope of the disclosure, and it is intended to include such modifications and variations within the scope of the following claims.

We claim:

1. The method of producing an omega-cyano-α-oximino carboxylic ester from an α,α'-dioximino cyclic ketone having a five to seven carbon ring which comprises cleaving the ring structure of the cyclic ketone between the carbonyl carbon and one of the alpha carbons by at least partially dissolving the cyclic ketone in an alcoholic base solution containing an alcohol selected from the group consisting of lower alkyl alcohols, benzyl alcohol, and cyclohexyl alcohol and a base selected from the group consisting of alkali metal and alkaline earth metal hydroxides, alkali metal and alkaline earth metal alcoholates derived from said alcohols, benzyltrimethylammonium hydroxide, butylamine, pyridine, and ammonia and reacting an acylating agent selected from the group consisting of lower alkyl carboxylic acid anhydrides, acetyl chloride, benzoyl chloride, and benzene-sulfonyl chloride with the cyclic ketone dissolved therein, thereby forming said omega-cyano-α-oximino carboxylic ester wherein the alcoholic moiety of said ester is derived from the alcoholic reaction medium.

2. The method of producing an omega-cyano-α-oximino carboxylic lower alkyl ester from an α,α'-dioximino cyclic ketone having a five to seven carbon ring which comprises cleaving the ring structure of the cyclic ketone between the carbonyl carbon and one of the alpha carbons by at least partially dissolving the cyclic ketone in a lower alkyl alcoholic solution containing at least an equimolar amount of an alkali metal lower alkoxide, and reacting an equimolar amount of acetic anhydride with the cyclic ketone dissolved therein, thereby forming said omega-cyano-α-oximino carboxylic lower alkyl ester wherein the alcoholic moiety of said ester is derived from the alcoholic reaction medium.

3. The method of producing a 2-oximino-5-cyanovaleric acid lower alkyl ester from 2,6-dioximinocyclohexanone which comprises at least partially dissolving 2,6-dioximinocyclohexanone in a lower alkyl alcoholic solution containing at least an equimolar amount of an alkali metal lower alkoxide, and reacting an equimolar amount of acetic anhydride with the cyclic ketone dissolved therein, thereby cleaving the ring structure to form a 2-oximino-5-cyanovaleric acid lower alkyl ester wherein the alcoholic moiety of said ester is derived from the alcoholic reaction medium.

4. The method of producing a 2-oximino-4-cyanobutyric acid lower alkyl ester from 2,5-dioximinocyclopentanone which comprises at least partially dissolving 2,5-dioximinocyclopentanone in a lower alkyl alcoholic solution containing at least an equimolar amount of an alkali metal lower alkoxide, and reacting an equimolar amount of acetic anhydride with the cyclic ketone dissolved therein, thereby cleaving the ring structure to form a 2-oximino-4-cyanobutyric acid lower alkyl ester wherein the alcoholic moiety of said ester is derived from the alcoholic reaction medium.

References Cited in the file of this patent

Beilstein's Handbuch der Organishen Chemie, vol, 3, pages 799–800, 1918.

UNITED STATES PATENT OFFICE

CERTIFICATE OF CORRECTION

Patent No. 3,059,018                                October 16, 1962

Grannis S. Johnson et al.

It is hereby certified that error appears in the above numbered patent requiring correction and that the said Letters Patent should read as corrected below.

Column 4, line 47, for "esters" read -- ester --; line 72, for "muut" read -- must --; column 8, line 39, for "4939" read -- 49.39 --.

Signed and sealed this 19th day of March 1963.

(SEAL)
Attest:
ESTON G. JOHNSON

Attesting Officer

DAVID L. LADD

Commissioner of Patents